United States Patent Office 3,386,768
Patented June 4, 1968

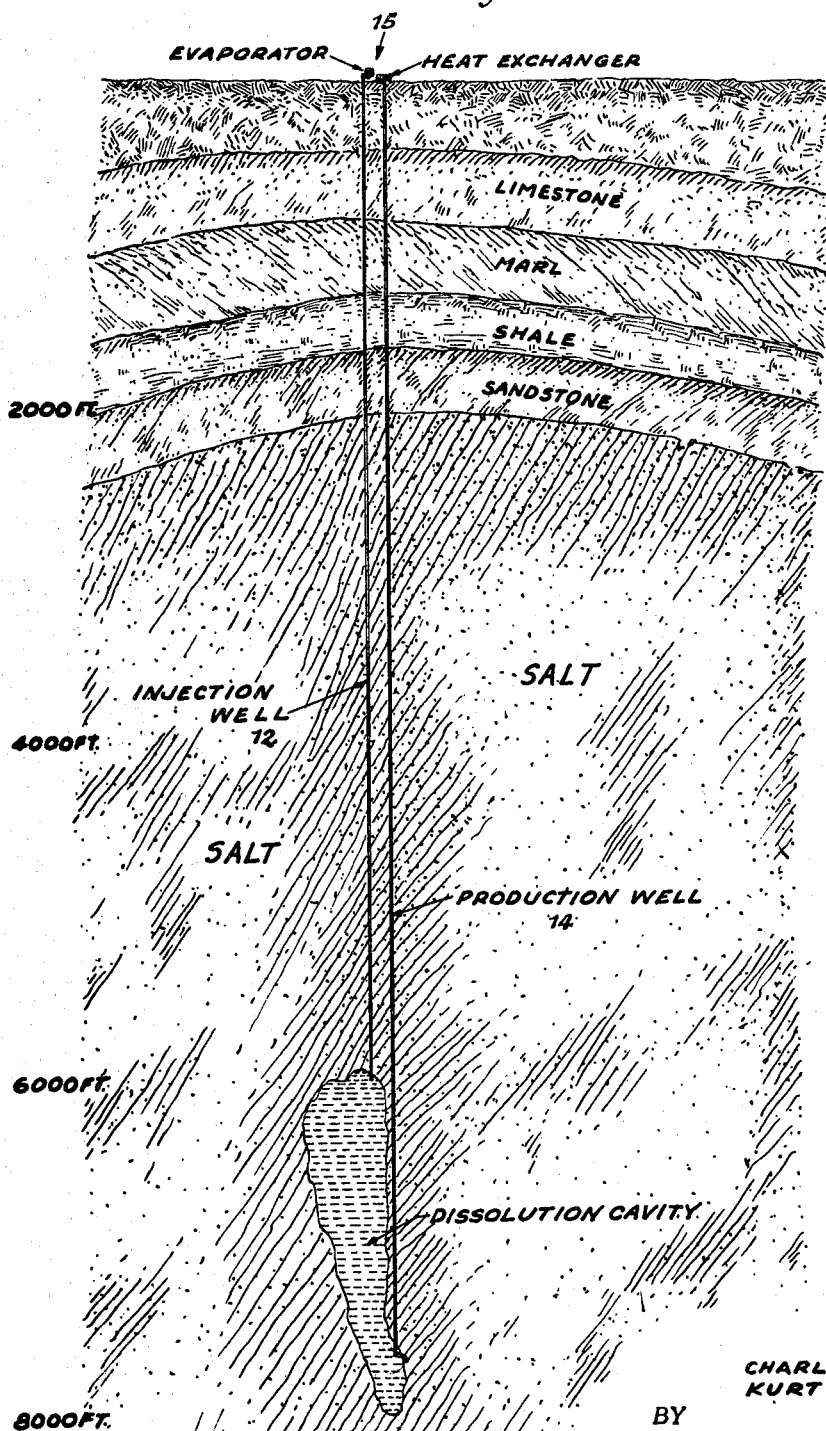

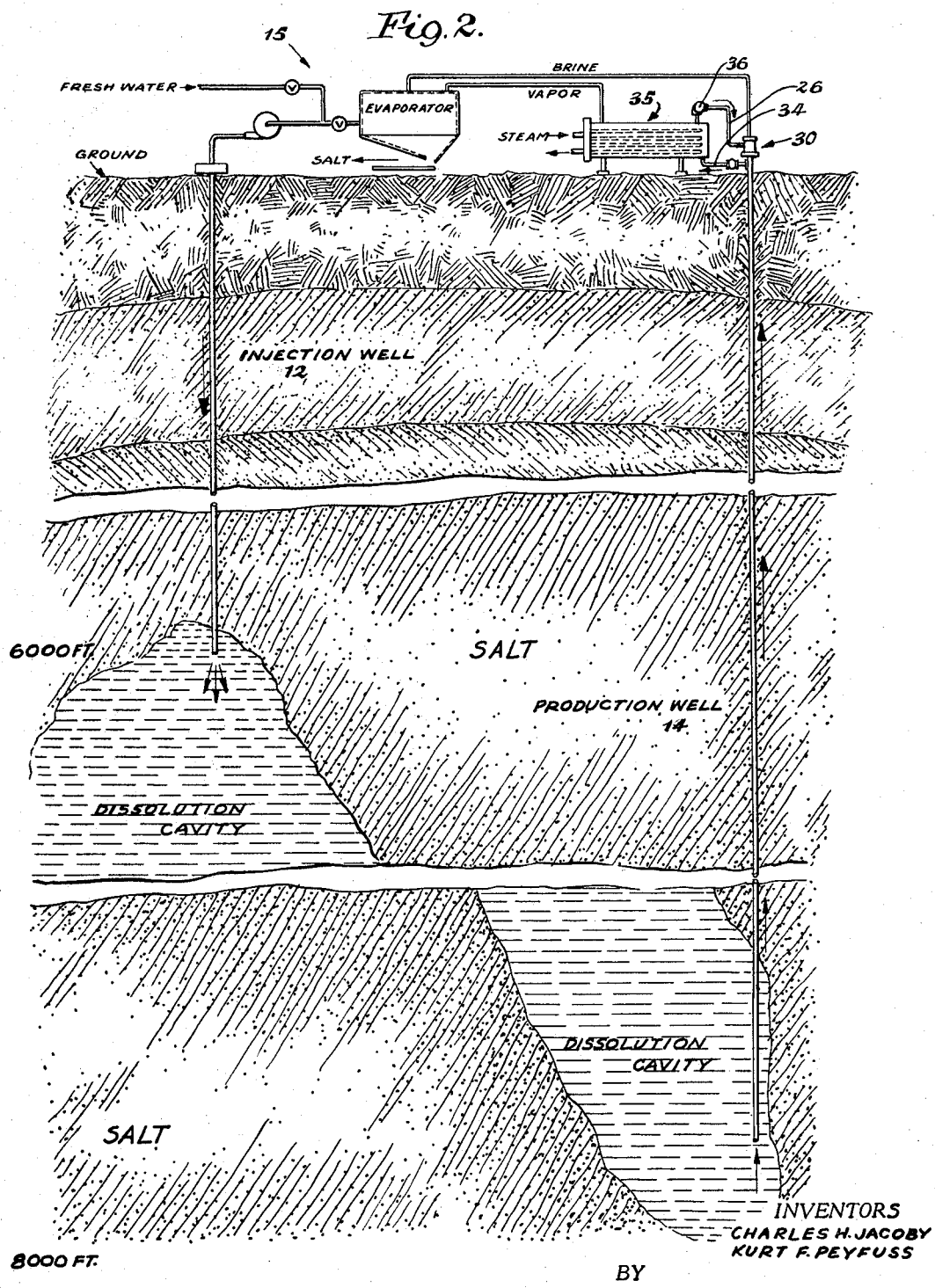

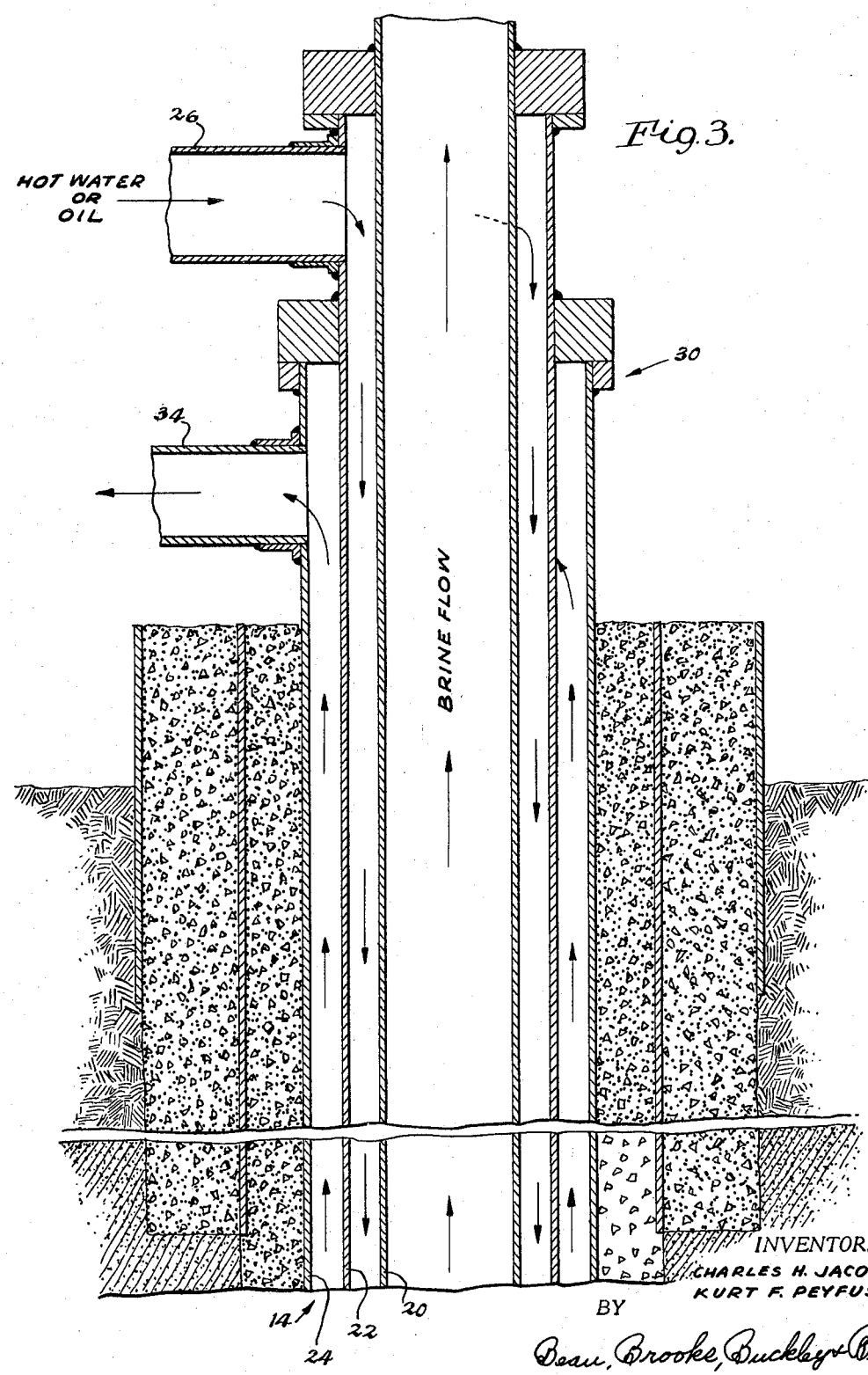

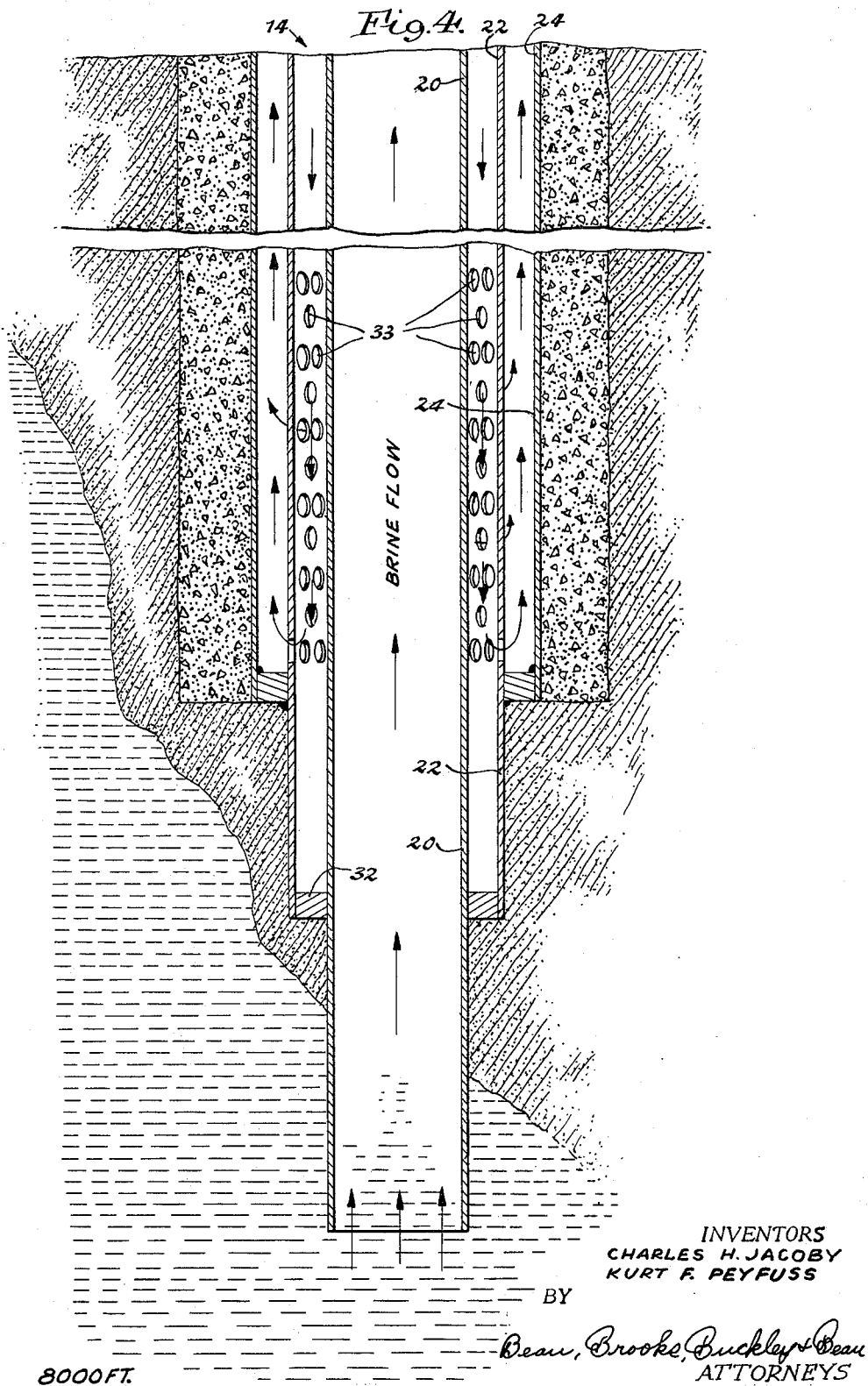

3,386,768
MINING AND REFINING SOLUBLE MINERALS
Charles H. Jacoby, Grosse Ile, and Kurt F. Peyfuss, Southfield, Mich., assignors to International Salt Company, Clarks Summit, Pa.
Filed Sept. 29, 1966, Ser. No. 583,020
7 Claims. (Cl. 299—4)

This invention relates to the concomitant mining and refining of soluble minerals; and more particularly to the mining of sodium chloride or other soluble mineral salts including impurities; the absolute and relative solubilities of which vary with temperature and/or pressure changes. More specifically, the invention relates to the type process disclosed in commonly assigned U.S. patent application Ser. No. 516,621 filed Dec. 27, 1965 and presently pending in the names of Charles H. Jacoby and John L. Ryon, Jr., now Patent No. 3,348,883. The present invention provides a still further improved process and means for refining or "purifying" mineral salts as aforesaid concomitant to the mining thereof, as distinguished for example from the processes disclosed in U.S. Patents Nos. 2,555,340 and 2,876,182 dealing with the refining of sodium chloride and similar salts, but only after the raw salt materials have been mined and conveyed to an aboveground purification facility.

Briefly stated, such prior processes involved taking the raw impure or run-of-mine salt into solution while heating the brine and thus making a super-saturated salt solution; and then subjecting the solution to evaporating and cooling processes whereby recrystallized, purified, sodium chloride is obtained. More specifically, as explained in the aforesaid patents, salt such as mined rock salt, usually consists of sodium chloride to the extent of about 90% to 98%; the balance being various impurities of which calcium sulphate is the principal impurity.

According to prior refining procedures, such "impure" salts have been "refined" in some instances by treatment of saline solutions obtained directly from wells, or from water-solutions produced by dissolving previously mined or otherwise produced impure salt substances in water or other suitable solvents. Then, purified salts have been extracted from such solutions by the use of vacuum-evaporator systems.

In accordance with the aforesaid patents, advantage is taken of the phenomenon known as the "inverse solubility" of calcium sulphate in relation to sodium chloride. The calcium sulphate content of the crude salt which is fed into the system will remain substantially undissolved under certain conditions, and can be removed by filtration or other known methods of separation. In carrying out the system, impure salt is first dissolved in a brine "saturating zone" wherein the temperature and pressure are maintained substantially greater than in the "evaporation" zone. Then when the brine is delivered into the evaporation zone a drop in temperature takes place, with the result that the brine becomes or remains undersaturated with respect to the calcium sulphate even though the concentration of the sodium chloride becomes substantially increased. Or, alternatively, the purer sodium chloride may be precipitated out of the solution at this stage, in accordance with the preferred practice. In such case any undissolved material, whether dirt or calcium sulphate, is separated from the brine before the brine is taken into the evaporation or recrystallizing zone, with the result that the sodium chloride becomes saparated from such impurities; and, if desired, it can then be precipitated out so as to provide a product of high purity. According to such systems sodium chloride of purities in excess of 99.98% can be produced directly from a source of relatively impure salt such as dirty rock salt.

However, it is a primary object of the invention disclosed in the aforesaid copending application Serial No. 516,621 to provide an impure combination salt mining and purifying method and means, employing only some of the previously patented practices referred to above; whereby certain operating advantages accrue in respect to the mining phase as well as in respect to the product beneficiation phase of the overall operation.

It is specifically the object of the present invention to provide improvements in operative techniques and apparatii such as disclosed in the aforesaid copending application, whereby to eliminate or reduce casing corrosion and/or scale deposit problems, as well as reducing the requisite differential operative pressures throughout the fluid-flow system, and minimizing product brine temperature fluctuations.

Other objects and advantages of the present invention will be apparent from the following specification and the accompanying drawing wherein:

FIG. 1 is a vertical sectional view through a geological formation including a typical salt "dome" in process of being mined in accordance with the present invention;

FIG. 2 is a fragmentary enlarged scale composite view of portions of FIG. 1, including a diagrammatic illustration of the surface-plant equipment of FIG. 1; and FIGS. 3, 4, are enlarged scale diagrammatic illustrations of typical well completion apparatii such as may be employed in conjunction with the production well casing head and foot sections respectively; in accordance with the system of the invention.

As shown by way of example herein, the invention is embodied in a system for simultaneously mining and "purifying" sodium chloride salt occurring in an underground deposit of the well known "salt dome" type; but it is to be understood that the invention may be usefully applied to other forms of soluble mineral deposits, such as sodium borate, potash, and the like. However, it is a feature of the invention that the system thereof is particularly adapted for use in connection with mineral deposits occurring at relatively great depths below the earth surface, employing as an incident thereto the ambient heat supply inherently existent at deep levels underground. For example, it is known that underground temperatures invariably increase with depth, and that in deep lying salt domes of example, temperatures of the order of 240 degrees F. have been recorded at depths of the order of 8,000 feet.

The system takes advantage of the fact that deposits of salt such as illustrated herein are at such depths that the earth temperatures ambient to a borehole leading downwardly from the surface and penetrating such a deposit are of high order, and may supply some of the heat source requirements for a coincident beneficiation operation when employing apparatus of the present invention. Hence, substantial operating economies are effected.

By way of more specific explanation, as illustrated herein a salt dome or other deposit may for example be intersected by a pair of vertical boreholes as indicated generally at 12–14, which will be referred to hereinafter as the "injection" well and the "production" well, respectively. To "complete" the boreholes and to prevent compression failures of the walls thereof, they will of course be preferably "cased" as is well known in the art. The borehole 14 is fitted with a casing system of the concentric triple casing type, for purposes to be explained more fully hereinafter. In any case the boreholes are drilled into the salt deposit so that at their nether or lower ends they penetrate into the deposit at some distance apart from one another, say of the order of 200 feet or so. Then, to provide for liquid circulation through the system the salt bed between the boreholes is fractured or channeled by any suitable method such as are well known in the industry.

For example, either one of the boreholes may be angularly deflected away from parallelism with the other borehole so as to intercept the other borehole as it approaches its prescribed depth. Techniques for this purpose are discussed for example in U.S. Patent 3,174,549. Or, in lieu thereof, the boreholes may be driven straight vertically and parallel, and later "channeled" together by means of a "fracturing" operation, such as disclosed in U.S. Patent 3,064,957. In any case the boreholes are thus provided in fluid-flow communicating relation adjacent their nether or lower ends, thereby providing a system wherein solvent may be pumped down one of the boreholes and brine delivered upwardly through the other to the surface plant. As is well known in the art, a dissolution cavity as illustrated for example in FIG. 1 will thereupon form in the salt deposit, from which saturated brine may be continuously pumped to the surface plant which is indicated generally at 15 (FIGS. 1, 2).

It is a particular feature of the present system that it utilizes the vast heat supplies existent at substantial depths in the earth's crust, to assist in the requisite vaporization and/or brine-evaporation phases of the salt product beneficiation operation; and in addition to heat the solvent (comprising the residual brine effluent from the evaporation operation plus make-up fresh solvent added if and when needed) as it is injected through the casing 12 into the dissolution cavity, thereby causing it to be delivered into the cavity in undersaturated condition. By circulating this understaturated solvent mixture into the dissolution cavity and from thence back to the surface and then through the salt recovery facility, under the specifically controlled conditions of the present invention as will be explained hereinafter, the salt deposit per se provides at the same time the source of raw mineral and a source of a portion of the heat which is also required in connection with the purification process. When the system is installed and operated within the specific parameters of the present invention, the heat so derived will be so conserved and utilized as to render the system in every way practicable; the abstraction of heat from the salt deposit being automatically compensated by continuous heat conduction replacements from the ambient geology.

As mentioned hereinabove, the brine delivery or "production well" casing portion of the system is of the triple casing type; illustrated herein as including concentrically arranged tubes 20, 22, 24. The primary (inner) conduit or tube 20 is provided to convey the product brine in heat-insulated form upwardly to the point of discharge of the brine into the evaporator portion of the brine treating apparatus. The present invention features an arrangement whereby the heated, saturated, brine derived from the dissolution cavity will be maintained under optimum pressure and temperature conditions until delivery to the "evaporator"; thereby preventing premature crystallization of solids in the conduit system.

To accomplish the primary purpose of this invention a closed-circuit type heat-exchange system is arranged in conjunction with the production brine casing 20. As best shown in FIGS. 3, 4, the brine up-flow conduit 20 and the next outer conduit 22 provide therebetween an annular passageway into which heated water, or oil, or sulphur, or other suitably fluid heat-conveying media may be injected, as from an inlet connection illustrated at 26 (FIG. 3), at the "well head" component of the production well as indicated generally at 30 (FIG. 2). The casing 22 is "packed" at its bottom end as indicated at 32 (FIG. 4) and perforated as shown at 33, and thus the annular space between the conduit 22 and the outermost casing 24 is arranged to provide a return passageway for the hot fluid traveling downwardly in heat exchange relation with the brine upflow casing 20. An exit connection 34 (FIG. 3) is provided at the well head in conjunction with the outer casing 24 to convey the "return" fluid to the heating apparatus such as is shown diagrammatically for example at 35 in FIG. 2.

The heater 35 may be of any suitable type commercially available heat exchanger employing any preferred form of heat energy source; such as steam from a stand-by boiler or the like. Also, the hot vapors effluent from the evaporator operation may be fed to the heater apparatus as illustrated at FIG. 2, to effect heat supply cost economies.

In any case, it is a particular feature of the present invention that the fluid heated by means of the apparatus 35 is circulated as by means of a pump 36 through a closed-circuit system comprising essentially the annular spaces between the well casings 20–22 and 22–24. Therefore the circulating fluid may be selected to provide certain preferred operative characteristics, such as being non-corrosive to the hardware coming in contact therewith, and/or free from precipitant-prone ingredients such as would otherwise tend to "scale" the casing walls or other hardware. Hence substantial maintenance difficulties and expense are avoided.

It is to be understood that the system of the invention may employ any preferred form of salt purifying apparatus. For example, as shown in FIG. 2 herewith it may be of a relatively simple, single stage, "evaporator" type wherein the heated saturated brine is discharged into an evaporator (as disclosed for example in U.S. Patents 2,555,340 and 2,876,182) wherein the brine is subjected to pressure and temperature drop conditions permitting pure solid salt to separate out from the brine. However it is to be understood that in lieu of the simple, basic form of refining system shown in FIG. 2 herewith, any other preferred multi-stage and/or more sophisticated refinery system (such as disclosed in the aforesaid patents) may be employed.

In any case, the effluent residual brine from the refining facility, which is being pumped back down the borehole 12, will be sodium chloride saturated at its injection temperature (except perhaps whenever evaporation losses require the addition of "make-up" solvent which may be furnished at somewhat lower temperature). However, as explained hereinabove, as this brine travels downwardly through the uninsulated casing 12 in heat-exchange relation therewith, it becomes heated, such as by example from an injection temperature of the order of say 90° F. up to a temperature of the order of 220° F. as it traverses the dissolution cavity; assuming the cavity ambient rock temperature to be of the order of 240° F. Because the brine upflow conduit 20 is of heat-insulated form as explained hereinabove, when the superheated (and therefore supersaturated) brine or solution reaches the evaporator apparatus it may well be in such a case of a temperature in the order of 215° F.; assuming a reasonable efficiency factor for the heat insulating means. The resistance to fluid flow offered by the extended casing structures will of course insure that the dissolution product is also maintained under high pressure until it is discharged into the evaporator apparatus. Hence, it will be appreciated that the operative characteristics of the solvent heating and saturating phase of the system bring it well within the realm of feasibility for realization of the objects as set forth hereinabove.

However, it is still another technological feature and economic advantage of the system that by virtue of the relative positional arrangements and operative relationships of the essential components of the system, there is no essential need for certain accessory devices such as are called for by prior art systems. This feature of the invention derives from the fact that insoluble impurities resident in the deposit being mined, tend to settle out from the brine when released by dissolution of the cavity wall material, and fall into and remain in the bottom of the cavity; and therefore the impurity carry-up into the refining apparatus is minimal. Hence, the need for filtering equipment is minimized, and the need for saturators, condensers, heaters, and the like in connection with the surface plant is completely eliminated. Also, because the insoluble impurities occurring in the mineral deposit are not brought to the surface, there is no problem at the surface plant with respect to disposal of wastes, such as might in turn create problems concerning nearby watershed pollution, or the like.

It is also noteworthy that in the case of the present system the phenomenon known as the "inverse solubility ratios" of sodium chloride and calcium sulphate (the major impurity ingredient of native rock salt) operates within the dissolution cavity of the system. Otherwise stated, because the solvent liquid in the cavity is maintained at high temperature it automatically retards dissolution of calcium sulphate into the brine. Therefore large percentages of this material when released in situ from the salt deposit will simply settle down into the bottom of the dissolution cavity, thereby reducing the impurity separation load on the surface plant. In fact, by virtue of this feature of the system, the surface refining plant requirements may well be so reduced that only a rudimentary form of solid salt recovery apparatus may be satisfactorily employed at the surface. Another feature attendant the mining system hereof is that sodium chloride or similar "rock salt" deposits of the deep-seated dome type are under such great and constant pressure and temperature conditions that any cavities formed therein continuously tend to close in upon thesmselves. Hence maintenance problems attendant large dissolution cavities are avoided.

It will be seen that by virtue of the present invention the externally heated fluid which is circulated through the casing system is, at the lower levels of the well, under pressures comparable to the pressures under which the brine exists at the bottom of the casing system. Thus, the packaging devices at the lower levels of the well are protected against any excessive pressure differential conditions, such as would exist at great depths in the case of a system not embodying the features of the present invention.

It will of course be appreciated that whereas only one form of suitable equipment and operating specifications have been illustrated and/or discussed by way of example herein, various changes may be made therein without departing from the spirt of the invention or the scope of the following claims.

We claim:

1. The method of concomitantly mining and beneficiating a deep underground high-temperature deposit of soluble mineral including impurities disposed at such depth beneath the earth's surface as to be surrounded by a high-temperature geological environment compared to the neighborhood earth surface rock temperature, to produce a relatively pure mineral product at the relatively low earth surface ambient temperatures, said method comprising, forming a pair of openings extending downwardly in laterally offset relation from the earth's surface into said deposit, pumping a solvent liquid downwardly through one of said openings in direct heat-exchange relation with the ambient geology thereby heating said solvent to an elevated temperature, and then directing said heated solvent to pass in dissolution-contact relation through said high-temperature mineral to provide a highly concentrated high-temperature solution of mineral, and thence to flow upwardly through the other of said openings to a treating plant operating under substantially earth's surface temperature and pressure conditions, for separation of purified mineral from the impurities in said solution, while simultaneously circulating in heat-exchange relation with said upflowing mineral solution a heat-transfer fluid flowing in a closed conduit system including a heater, whereby to avoid mixing with said solution and to maintain said solution at a prescribed high-temperature condition until delivery to said treating plant.

2. The method as set forth in claim 1 wherein said mineral deposit comprises a sought-for ingredient having insolubility characteristics varying in direct relation to temperature changes and impurity ingredients of inverse relation solubility characteristics, whereby the heated solvent passing through said deposit produces a dissolution product having an improved ratio of pure vs. impure ingredients for discharge into said treating plant.

3. The method as set forth in claim 1 wherein said sought-for mineral ingredient is of crystalline form and whereby when said purified mineral separates from said dissolution product it precipitates in recrystallized form.

4. The method as set forth in claim 1 wherein the liquid effluent from said treating plant is fed to said solvent pumping operation thereby comprising a portion of the make-up of said solvent.

5. The method as set forth in claim 4 wherein said solvent includes a relatively lower temperature fresh water make-up ingredient.

6. A method as set forth in claim 1 wherein said treating plant comprises a series of evaporator devices, the liquid effluent from each said evaporator device comprising the feed input to the next succeeding evaporator device and the liquid effluent from the last evaporator being delivered to the solvent make-up system for recirculation through the dissolution area and treating plant in closed circuit manner.

7. The method as set forth in claim 1 wherein said solution is passed upwardly through the other of said openings through first tube means and wherein said heat transfer fluid flows through second tube means positionally related concentrically of said first tube means.

References Cited

UNITED STATES PATENTS

| 2,161,800 | 6/1939 | Cross | 299—4 X |
| 3,205,012 | 9/1965 | Dancy | 299—4 |
| 3,348,883 | 10/1967 | Jacoby et al. | 299—4 |

ERNEST R. PURSER, *Primary Examiner.*

UNITED STATES PATENT OFFICE
CERTIFICATE OF CORRECTION

Patent No. 3,386,768            June 4, 1968

Charles H. Jacoby et al.

It is certified that error appears in the above identified patent and that said Letters Patent are hereby corrected as shown below:

Column 2, line 5, "impure" should read -- improved --.
Column 5, line 39, "packaging" should read -- packing --.

Signed and sealed this 28th day of October 1969.

(SEAL)
Attest:

Edward M. Fletcher, Jr.
Attesting Officer

WILLIAM E. SCHUYLER, JR.
Commissioner of Patents